(12) United States Patent
O'Brien (10) Patent No.: US 10,056,106 B1
(45) Date of Patent: Aug. 21, 2018

(54) METHODS AND DEVICES FOR POWER CONTROL OF A LIGHT SOURCE OF A MEMORY SYSTEM

(71) Applicant: AVAGO TECHNOLOGIES GENERAL IP (SINGAPORE) PTE. LTD., Singapore (SG)

(72) Inventor: Scott O'Brien, Mendota Heights, MN (US)

(73) Assignee: AVAGO TECHNOLOGIES GENERAL IP (SINGAPORE) PTE. LTD., Singapore (SG)

( * ) Notice: Subject to any disclaimer, the term of this patent is extended or adjusted under 35 U.S.C. 154(b) by 0 days.

(21) Appl. No.: 15/590,743

(22) Filed: May 9, 2017

(51) Int. Cl.
| | | |
|---|---|---|
| *G11B 11/00* | (2006.01) |
| *G11B 7/126* | (2012.01) |
| *H05B 37/02* | (2006.01) |
| *G11B 5/012* | (2006.01) |
| *G11B 7/13* | (2012.01) |
| *G11B 20/18* | (2006.01) |
| *G11B 5/00* | (2006.01) |
| *G11B 7/1263* | (2012.01) |
| *G11B 7/1267* | (2012.01) |
| *G11B 5/60* | (2006.01) |

(52) U.S. Cl.
CPC .............. *G11B 7/126* (2013.01); *G11B 5/012* (2013.01); *G11B 7/13* (2013.01); *G11B 20/18* (2013.01); *H05B 37/0227* (2013.01); *G11B 5/6088* (2013.01); *G11B 7/1263* (2013.01); *G11B 7/1267* (2013.01); *G11B 2005/0021* (2013.01)

(58) Field of Classification Search
None
See application file for complete search history.

(56) References Cited

U.S. PATENT DOCUMENTS

| | | | | |
|---|---|---|---|---|
| 5,436,880 A * | 7/1995 | Eastman | ............... | G11B 7/126 |
| | | | | 369/116 |
| 9,318,142 B2 | 4/2016 | Kiely | | |
| 9,502,068 B1 | 11/2016 | Haralson | | |
| 9,747,937 B1 * | 8/2017 | Duda | ................... | G11B 5/6082 |
| | | | | 369/13.26 |
| 2005/0213450 A1 * | 9/2005 | Yamada | ............. | G11B 7/00736 |
| | | | | 369/47.53 |
| 2007/0014197 A1 * | 1/2007 | Verschuren | ....... | G11B 11/10515 |
| | | | | 369/13.26 |
| 2007/0030789 A1 * | 2/2007 | McCormack | .......... | G11B 7/126 |
| | | | | 369/116 |
| 2007/0230313 A1 * | 10/2007 | Kawasumi | ........... | G11B 7/1263 |
| | | | | 369/116 |

(Continued)

*Primary Examiner* — Tan X Dinh
(74) *Attorney, Agent, or Firm* — Sheridan Ross P.C.

(57) ABSTRACT

A circuit includes a light source, a sensor, and a switch. The sensor measures output of the light source and provides an electrical signal to a feedback loop that is indicative of the measured output of the light source. The switch is positioned in the feedback loop and is movable between a first position and a second position depending upon whether the feedback loop is operating in a first mode of operation or a second mode of operation. During the first mode of operation the output of the feedback loop adjusts at least one operating parameter of the light source responsive to the electrical signal. During the second mode of operation the output of the feedback loop does not adjust the at least one operating parameter of the light source responsive to the electrical signal.

20 Claims, 7 Drawing Sheets

(56) References Cited

U.S. PATENT DOCUMENTS

| | | | |
|---|---|---|---|
| 2010/0142336 A1* | 6/2010 | Ishibashi | G11B 7/1263 369/47.5 |
| 2011/0038235 A1* | 2/2011 | Matsumoto | G11B 5/314 369/13.26 |
| 2016/0087402 A1* | 3/2016 | Tatah | H01S 5/06804 372/34 |

* cited by examiner

METHODS AND DEVICES FOR POWER CONTROL OF A LIGHT SOURCE OF A MEMORY SYSTEM

FIELD OF THE DISCLOSURE

Example embodiments are directed to methods and devices for power control of a light source, more particularly, for power control of a light source in magnetic recording systems.

BACKGROUND

High capacity hard disk drives (HDDs) and other magnetic storage devices employ thermally stable fine-grained high coercivity media. The high coercivity media requires write fields in excess of those attainable with current write heads, the performance of which are limited by pole tip saturation and material properties. Energy-assisted magnetic recording techniques overcome the coercivity/write-field conflict. In heat-assisted magnetic recording (HAMR), the temperature of the recording medium in the write zone is elevated to near the Curie point, typically by a light source (e.g., a laser), which eases magnetization by an achievable write field. However, the laser threshold (i.e., the amount of power required to activate the laser) varies depending on the temperature of the laser, which causes inefficiencies in power consumption and performance. Thus, it is desired to implement power control methods and/or devices that reduce unnecessary power consumption by the laser and that provide improved performance.

BRIEF DESCRIPTION OF THE DRAWINGS

The present disclosure is described in conjunction with the appended figures, which are not necessarily drawn to scale.

DETAILED DESCRIPTION

Various aspects of the example embodiments will be described herein with reference to drawings that are schematic illustrations of idealized configurations. It should be appreciated that while particular circuit configurations and circuit elements are described herein, example embodiments are not limited to the illustrative circuit configurations and/or circuit elements depicted and described herein. Specifically, it should be appreciated that circuit elements of a particular type or function may be replaced with one or multiple other circuit elements to achieve a similar function without departing from the scope of example embodiments.

It should also be appreciated that example embodiments described herein may be implemented in any number of form factors. Specifically, the entirety of the circuits disclosed herein may be implemented in silicon as a fully-integrated solution (e.g., as a single Integrated Circuit (IC) chip or multiple IC chips) or they may be implemented as discrete components connected to a Printed Circuit Board (PCB).

Figure 1:
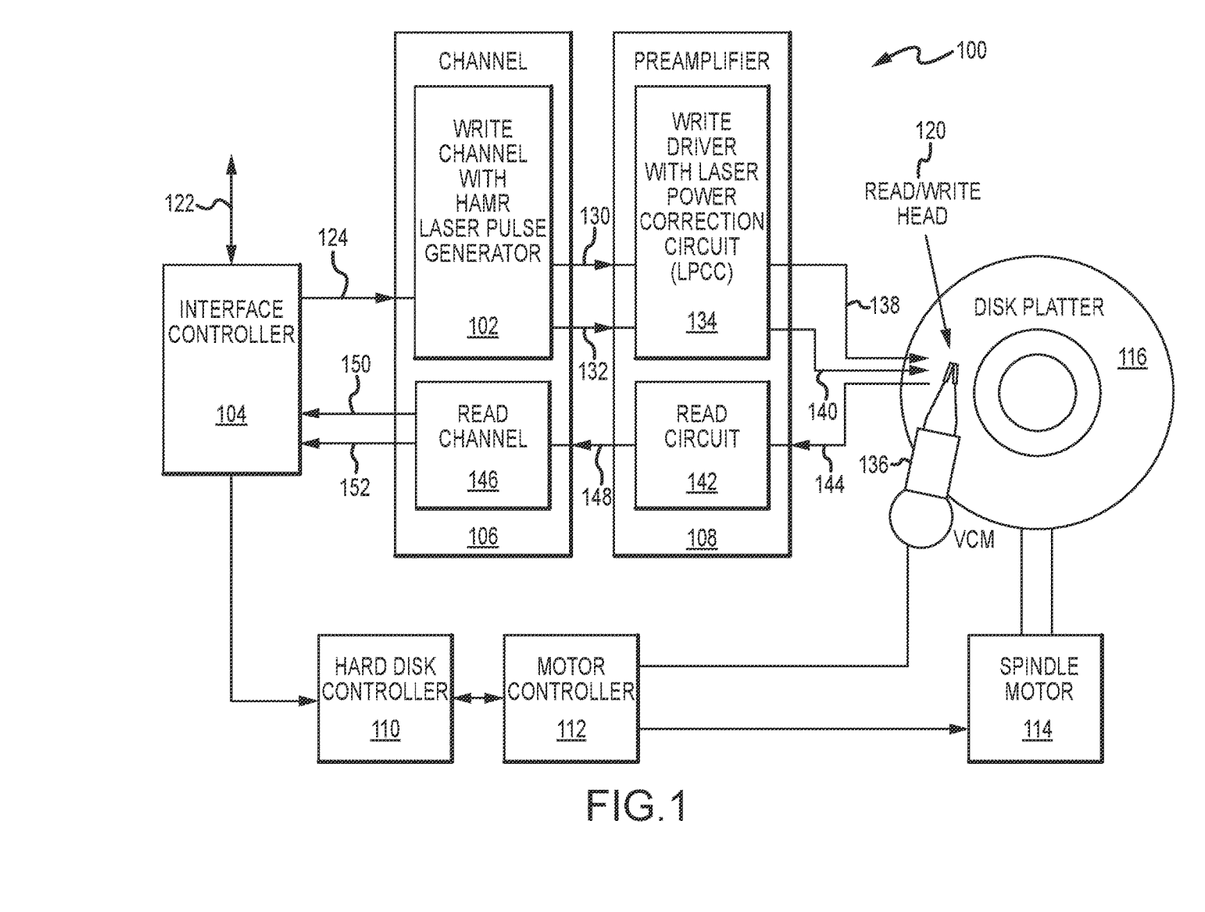
FIG. 1 illustrates a magnetic storage system according to at least one example embodiment.

Turning to FIG. 1., a magnetic storage system (or storage system) 100 includes a write channel 102 that generates triggerable HAMR laser pulse generator in accordance with some embodiments. Storage system 100 may be, for example, a hard disk drive. Storage system 100 includes an interface controller 104, channel circuit 106, preamplifier 108, a hard disk controller 110, a motor controller 112, a spindle motor 114, a disk platter 116, and a read/write head assembly 120. Interface controller 104 controls addressing and timing of data to/from disk platter 116. The interface controller 104 may include devices such as a processor, buffer memory, format control, error correction circuits, and interface circuits. The data on disk platter 116 consists of groups of magnetic signals that may be written and detected by read/write head assembly 120 when the assembly is properly positioned over disk platter 116. In one embodiment, disk platter 116 includes magnetic signals recorded in accordance with either a longitudinal or a perpendicular recording scheme.

During a write operation, interface controller 104 receives digital data 122 to be stored on the disk platter 116 and provides corresponding digital write data 124 to the write channel 102 in the channel circuit 106. The digital data 122 may be received in serial form on a standardized device interface such as a Serial Advanced Technology Attachment (SATA) interface. During write operations, the digital data 122 is stored in a local buffer memory, formatted and augmented with error correction codes.

Write channel 102 may process the digital write data 124 in a number of ways, such as serializing the data, modulation coding the data and adding parity bits, serializing the data at the desired bit-rate, and performing magnetic write precompensation. The write channel 102 also generates laser trigger pulses. The write channel 102 provides encoded write data 130 and the laser trigger pulse signal 132 to a write driver with a laser power control circuit (LPCC) 134 in preamplifier 108. In some embodiments, the preamplifier 108 is mounted on an actuator arm 136, and the encoded write data 130 and laser trigger pulse signal 132 are driven from the channel circuit 106 by transmitters and delivered over a flex-cable in differential positive emitter-coupled logic (PECL) format to the write and laser driver 133 in the arm-mounted preamplifier 108. The preamplifier 108 converts the encoded write data 130 to an analog signal, generates a laser pulse control signal based on the laser trigger pulse signal 132, and impresses in the read/write head assembly 120 a bipolar programmable write current 138 of polarity determined by that of the PECL input 132. Simultaneously, PECL laser trigger pulse signal input 132 causes generation of a laser pulse control signal 140 which is impressed in read/write head assembly 120.

In a typical read operation, read/write head assembly 120 is accurately positioned by motor controller 112 over a desired data track on disk platter 116. Motor controller 112 both positions read/write head assembly 120 in relation to disk platter 116 and drives spindle motor 114 by moving read/write head assembly 120 to the proper data track on disk platter 116 under the direction of hard disk controller 110. Spindle motor 114 spins disk platter 116 at a determined spin rate (RPMs). A read circuit 142 in the preamplifier 108 establishes a bias current in the magneto-resistive read/write head assembly 120. Once read/write head assembly 120 is positioned adjacent the proper data track, magnetic signals representing data on disk platter 116 are sensed by read/write head assembly 120 as disk platter 116 is rotated by spindle motor 114. The sensed magnetic signals are provided as a continuous, minute analog signal 144 representative of the magnetic data on disk platter 116. This minute analog signal 142 is transferred from read/write head assembly 120 to read circuit 142 in the preamplifier 106, where it is amplified and is conveyed to a read channel 146 in the channel circuit 106 as analog read data 148. In turn, read channel 146 decodes and digitizes the received analog signal to recreate the user data originally written to disk platter 116, as well as extracting servo information.

As part of processing the analog read data 148, read channel circuit 146 may perform one or more operations such as analog filtering, variable gain amplification, analog to digital conversion, equalization, timing recovery, data detection, decoding, deserialization, and servo demodulation to obtain the user data and servo information. The user data is provided by read channel 146 as digital read data 150 to the interface controller 104, where it is error-corrected, stripped of special formatting fields, and reassembled in buffer memory for transmission to a user device as digital data 122. The read channel 146 also provides the servo data 152 to the interface controller 104 for use in driving the hard disk controller 110 and motor controller 112. During both the read and write operations, microcode in the interface controller 104 controls spindle speed and regulates head position to maintain accurate track-following and to seek between tracks. Servo position information for these functions is demodulated by the read channel 146 from dedicated fields prerecorded on the disk platter 116 at intervals between data records.

It should be noted that storage system 100 may be integrated into a larger storage system such as, for example, a RAID (redundant array of inexpensive disks or redundant array of independent disks) based storage system.

It should also be noted that various functions or blocks of storage system 100 may be implemented in either software or firmware, while other functions or blocks are implemented in hardware. The various blocks disclosed herein may be implemented in integrated circuits along with other functionality. Such integrated circuits may include all of the functions of a given block, system or circuit, or only a subset of the block, system or circuit. Further, elements of the blocks, systems or circuits may be implemented across multiple integrated circuits. Such integrated circuits may be any type of integrated circuit known in the art including, but are not limited to, a monolithic integrated circuit, a flip chip integrated circuit, a multichip module integrated circuit, and/or a mixed signal integrated circuit. It should also be noted that various functions of the blocks, systems or circuits discussed herein may be implemented in either software or firmware. In some such cases, the entire system, block or circuit may be implemented using its software or firmware equivalent. In other cases, the one part of a given system, block or circuit may be implemented in software or firmware, while other parts are implemented in hardware.

Figure 2:
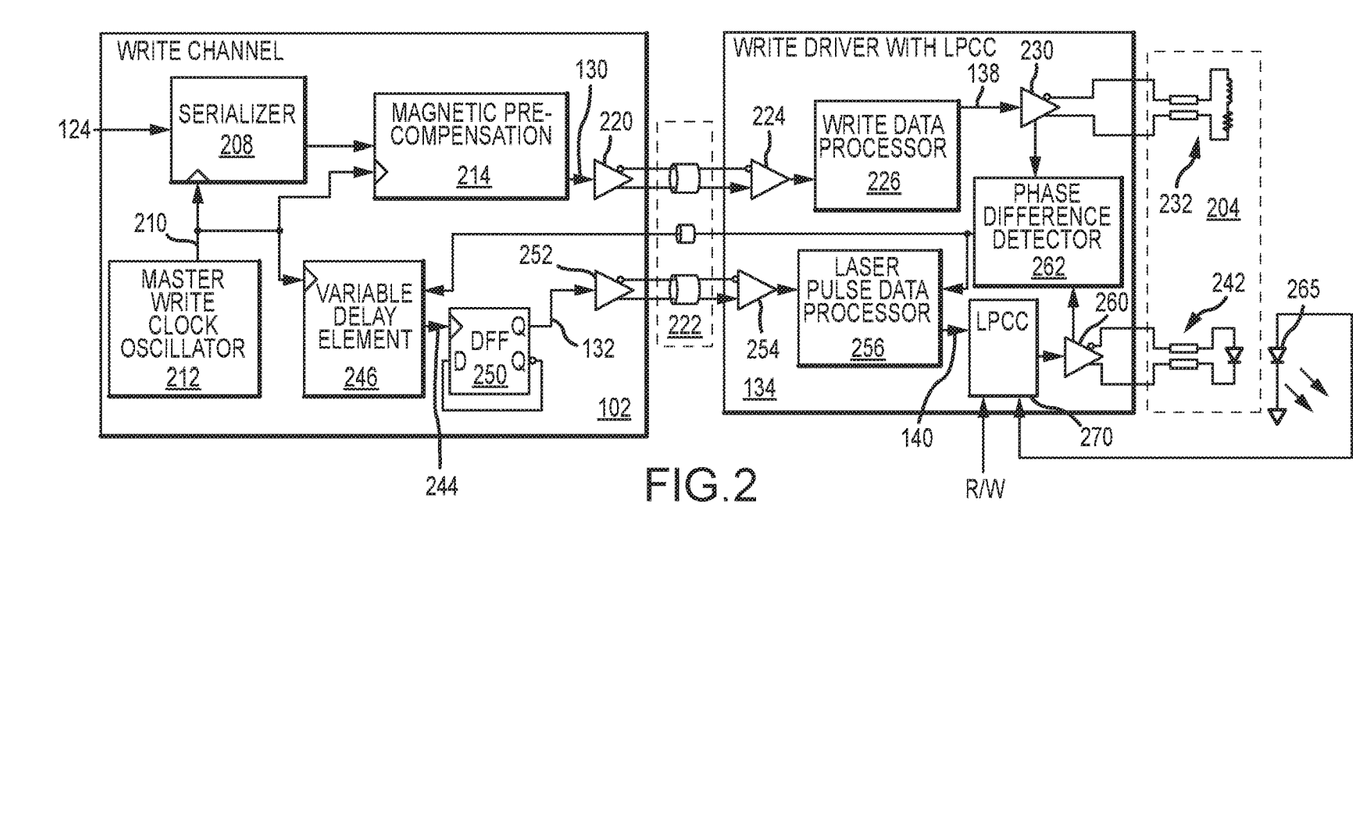
FIG. 2 illustrates an implementation of the write channel, the write driver, and the write head assembly of FIG. 1 according to at least one example embodiment.

FIG. 2 illustrates an implementation of a write channel 102, a write driver with LPCC 134, and write head assembly 204 (of the read/write head assembly 120) suitable for use in the magnetic storage system 100 of FIG. 1 in accordance with at least one example embodiment. Write data 124 is provided to the write channel 102, where it is run-length-encoded, serialized in a serializer 208 and synchronized to a clock signal 210 from a master write clock oscillator 212. Alternatively, write data 124 is encoded prior to reaching the write channel 102 (e.g., by interface controller 104), in which case the write channel 102 receives encoded write data that does not need to be further encoded. The master write clock oscillator 212 may be any circuit or device for generating a clock signal 210, such as a multiphase ring oscillator forming part of a frequency synthesizer locked to a reference crystal source, or to servo information prerecorded on the disk platter. The serializer 208 converts a parallel data input to a serial data stream. The serializer 208 may be, but is not limited to, a time-division data multiplexer, which multiplexes the parallel data input to a single output, controlled by a multi-phase clock circuit which generates multiple select clock signals, distributed equally in phase over 360 degrees, and which may be derived from the clock signal 210. The multiple select clock signals are used to select individual bits of the parallel data input in a particular order. Based on the disclosure herein, one of ordinary skill in the art will recognize a variety of circuits that may be used to serialize the write data 124, for example a shift register.

The write data 124 is prepared in the write channel 102 to be written by the write head assembly 204 to the magnetic storage medium. Writing information to a magnetic storage medium includes generating a magnetic field in close proximity to the storage medium to be written. One problem that may arise when writing to a magnetic storage medium is that the magnetic field generated by a preceding bit pattern may interfere or otherwise affect a magnetic field generated during a write of a succeeding bit pattern. In particular, a magnetic field generated to write a current bit pattern may exhibit a non-linear transition shift (NLTS) caused by magnetic interactions between write-field and already written transitions in high density magnetic recording. NLTS leads to data-dependent nonlinear distortions in the read back signal, causing degradation in data-recovery performance, and is countered by use of a magnetic precompensation circuit 214 in the write data path. The magnetic precompensation circuit 214 applies pattern-dependent delays to the write data as it is impressed in the magnetic write head to compensate for NLTS such that each bit of the write data is written to a desired location on the storage medium.

It should be noted that while various components of the write channel 102 and write driver with LPCC 134 are described as "circuits" that they may be implemented either as an electronic circuit or as a software/firmware circuit. Such software/firmware circuits include a processor associated with a memory device that includes instructions executable by the processor to perform the particular functions described herein. Such processors may be general purpose processors or processors specifically tailored to perform a given function depending upon the particular implementation requirements. In some cases, the processor may be designed to perform functions related to more than one particular module. Based on the disclosure provided herein, one of ordinary skill in the art will recognize a variety of combinations of dedicated electronic circuitry and software/firmware that may be used in accordance with different embodiments.

The magnetic write data 130, which in some embodiments is write-precompensated, is provided to a driver 220, which transmits the magnetic write data 130 in differential or other form across a multi-conductor actuator arm flexible transmission line 222 to the arm-mounted write driver with LPCC 134. A receiver 224 receives the transmitted magnetic write data and provides it to a write data processor 226 and write driver 230, which convert the magnetic write data to an analog signal and drive the magnetic write head 232 to record the data to a disk platter. The write data processor 226 and write driver 230 may perform a variety of functions in different embodiments of a magnetic storage system, and those of ordinary skill in the art will recognize a number of circuits that may be used to perform these functions.

In order to support high-density recording of data on the medium, in accordance with the principles of HAMR, a laser trigger pulse signal 132 may be generated in the write channel 102 to drive a laser diode (or light source) 242 in the write head assembly 204 as data bits are written by the magnetic write head 232. The laser diode 242 is pulsed in conjunction with the data bits written by the magnetic write head 232, reducing power consumption and heating in the flexible transmission line 222 and/or write head assembly 204 and aiding in areal density increase. The pulses in the laser diode 242 may be correlated with the data bits as they are written by the magnetic write head 232 in a variety of techniques to meet the system requirements and improve the readability and stability of the recorded data. A shifted clock signal 244 is provided by a variable delay element 246, which is implemented in some embodiments as a programmable phase interpolator or edge selector switch, enabling the establishment of phasing of the laser pulse-data relative to the magnetic data. The variable delay element 246 in these embodiments mixes and/or selects appropriate phases of multiphase ring oscillator in master write clock oscillator 212 to produce a shifted clock signal 244 of frequency equaling that of magnetic write clock signal 210, but with programmable phase relationship thereto. Other delay methods may also be used.

A laser trigger pulse signal 132 is generated at the transition rate of the magnetic write data 216 by a signal generator based on shifted clock signal 244, thereby reducing heating and bandwidth requirements in the flexible transmission line 222 due to the laser trigger pulse signal 132. In some embodiments, the signal generator comprises a D flip flop 250. As one laser pulse per bit requires a full on/off cycle to occur in each run length coded bit cell in the magnetic write data 216, the laser pulse control signal 140 has a frequency twice that of the magnetic write data 216. The flip flop 250 transforms the shifted clock signal 244 from a form having one electrical cycle per written bit to one having one edge per bit, minimizing bandwidth requirements in the flexible transmission line 222. The result is driven out differentially onto the flexible transmission line 222 by a driver 252 for reception by a receiver 254 in the write driver with LPCC 134. Based on the disclosure herein, one of ordinary skill in the art will recognize a variety of circuits that may be used to generate laser trigger pulse signal 132 based on shifted clock signal 244.

In other embodiments, to minimize the number of conductors in the flexible transmission line 222, the laser trigger pulse signal 132 is transmitted by the driver 252 to the write driver with LPCC 134 by multiplexing the data onto lines not used during a write operation, for example using read data transmission lines (e.g., 148, FIG. 1). In multiplexing, line 148 of FIG. 1 during read operations conveys read data from preamplifier 108 to read channel 146. Conversely, during write operations, line 148 conveys laser trigger pulses from write channel 102 to write driver with LPCC 134.

A receiver 254 in the write driver with LPCC 134 receives the laser trigger pulse signal 132 and delivers it to a laser pulse data processor 256, the output of which controls the laser diode 242 through LPCC 270 and laser driver 260. Alternatively, the laser driver 260 can be bypassed or not included if further amplification of the output of LPCC 270 is not desired. The laser pulse data processor 256 includes a triggerable pulse generator that generates a data rate laser pulse control signal 140 based on laser trigger pulses from the write channel 102. The triggerable pulse generator is activated by each edge, both positive-going and negative-going, of the laser trigger pulses. The laser pulse data processor 256 may also control the pulse width of the laser pulse control signal 140. The laser driver 260 amplifies the low-level laser pulse control signal 140 to a programmable amplitude sufficient to drive the laser diode 242 between threshold and pulse-on states over an extinction to full-on range.

The LPCC 270 receives output from sensor 265 (e.g., a light sensor such as a photodetector, a photodiode, a bolometer, etc.) and performs laser power control operations, described in more detail below with reference to FIGS. 3-7.

To assure that the output of the laser driver 260 is properly time-aligned to the output of the write driver 230, a phase difference detector 262 may be provided in the write driver with LPCC 134 to measure phase difference and control the variable delay element 246 in the write channel 102. In some embodiments, the phase difference detector 262 controls the laser pulse data processor 256. The phase difference detector 262 may be, but is not limited to, a local phase detector or part of a loopback circuit.

Figure 4:
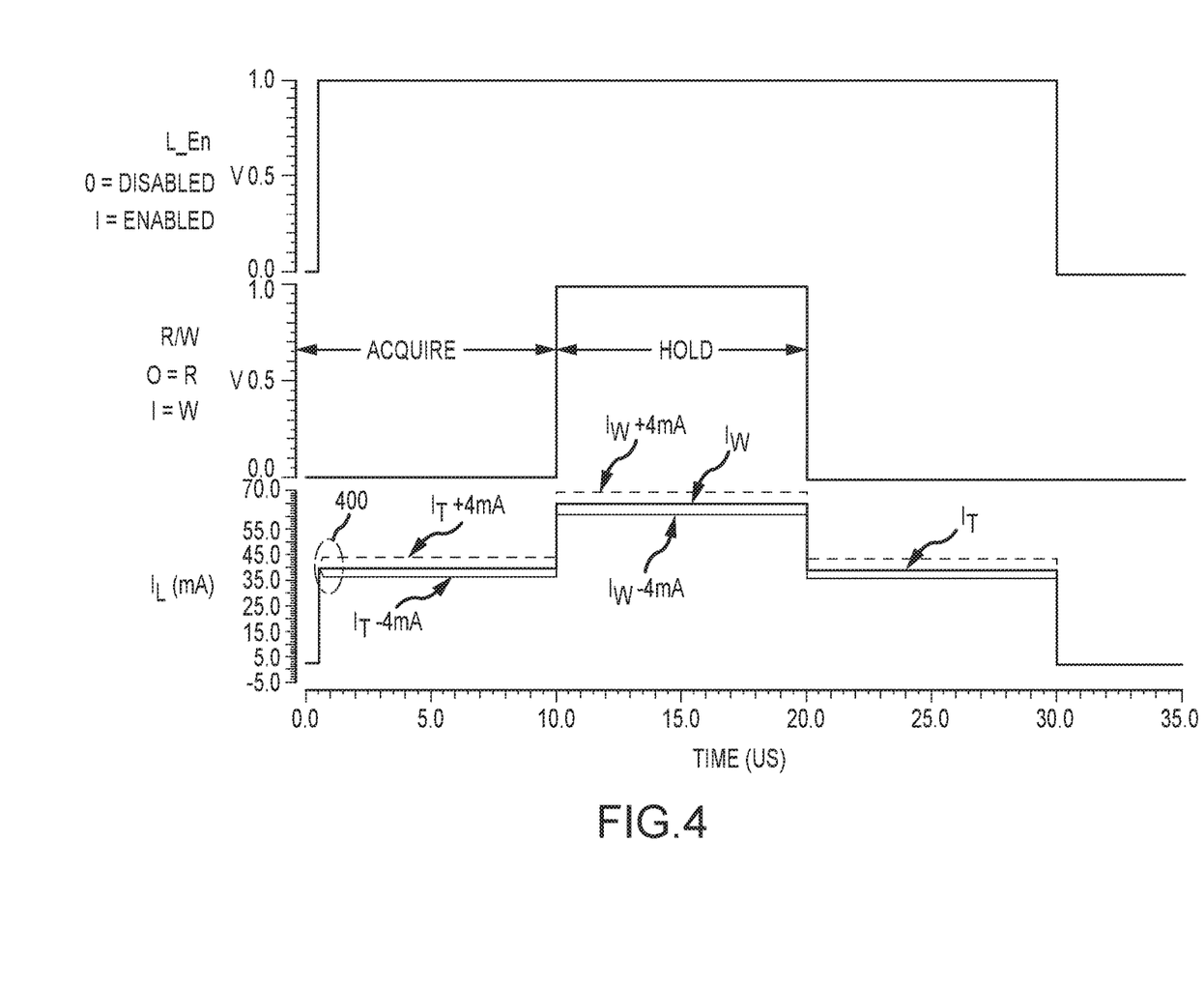
FIG. 4 illustrates an example timing diagram for operating the storage system described in FIGS. 1-3 according to at least one example embodiment.
Figure 5:
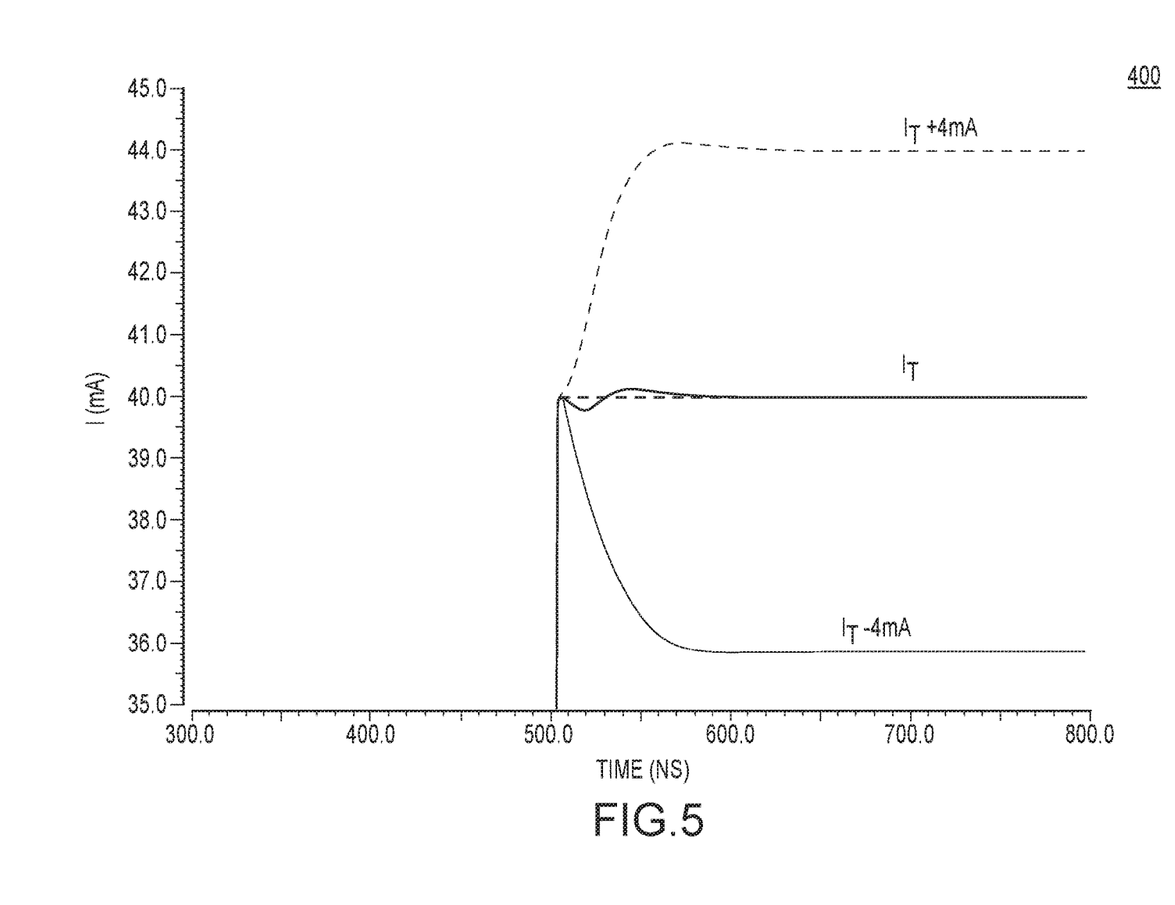
FIG. 5 illustrates a zoomed-in version of area 400 in FIG. 4 according to at least one example embodiment.

Although FIGS. 1 and 2 discuss generating various pulse signals (e.g., 132/140) for the light source 242, it should be understood that such signals may also be continuous (i.e., not pulsed). FIGS. 4 and 5 illustrate an example of using continuous signals to control the light source 242.

Figure 3:
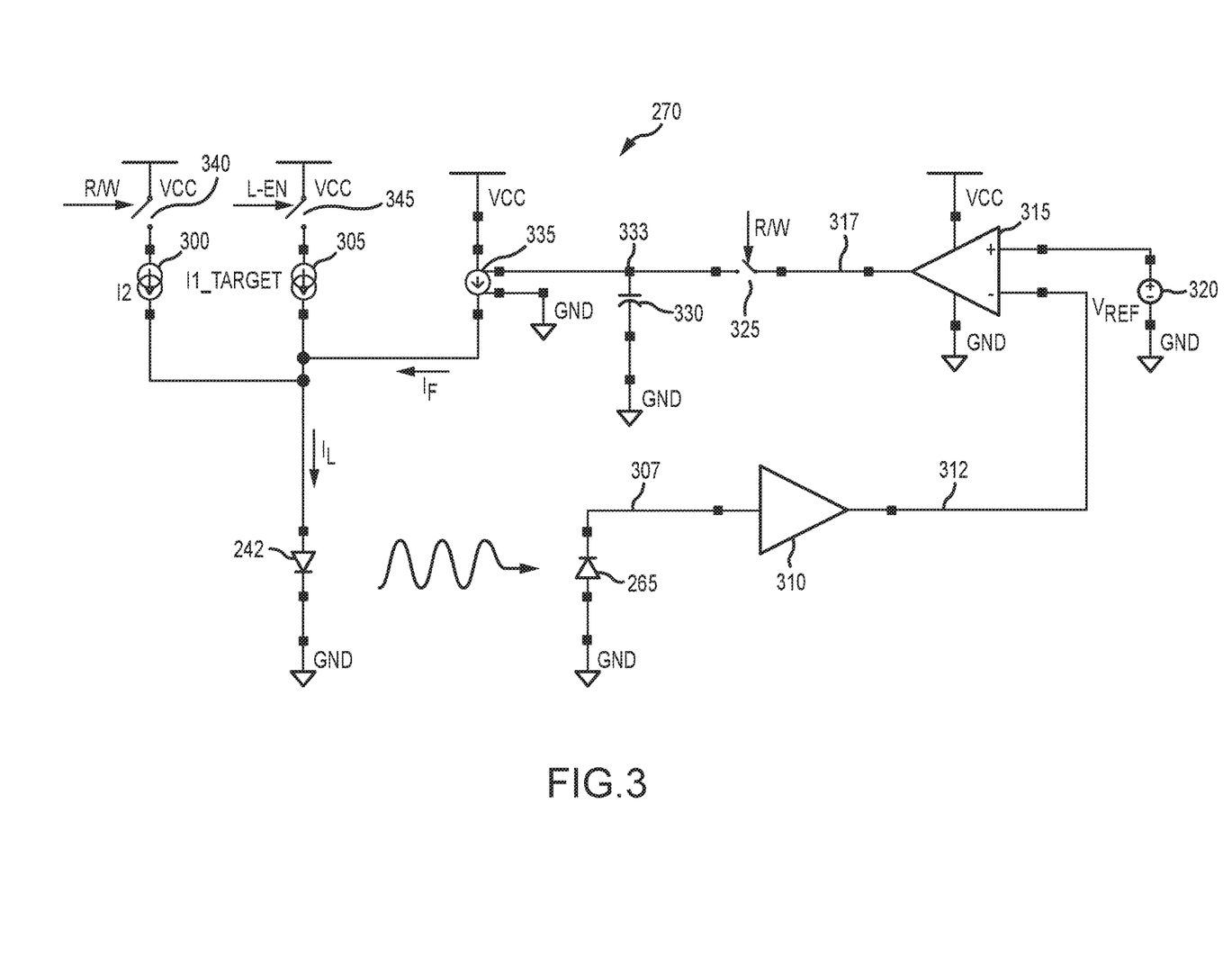
FIG. 3 illustrates the LPCC of FIGS. 1 and 2 according to at least one example embodiment.

FIG. 3 illustrates the LPCC 270 of FIG. 2 according to at least one example embodiment. As shown in FIG. 3, the sensor 265 measures output of the light source 242 and provides an electrical signal 307 to a feedback loop that is indicative of the measured output of the light source 242. Here, the feedback loop is connected to an input of the light source 242 such that the output of the light source 242 is adjustable in response to output of the feedback loop that is based on the electrical signal 307 provided to the feedback loop by the sensor 265. The LPCC 270 includes a switch 325 positioned in the feedback loop that is movable between a first position and a second position depending upon whether the feedback loop is operating in a first mode of operation or a second mode of operation. The switch 325 may comprise a physical switch that is movable between an open and a closed position. The position of the switch 325 may be determined based on a read/write signal R/W (e.g., from interface controller 104) that controls whether the storage system 100 is reading data or writing data. The switch 325 may be implemented by other known switching circuitry, such as a transistor. In this case, a gate of the transistor is connected to the read/write signal R/W while a source and drain of the transistor is connected between the output 317 and the capacitance 330.

During the first mode of operation, the output of the feedback loop adjusts at least one operating parameter of the light source 242 responsive to the electrical signal 307. Here, the switch 325 is in a closed position. During the second mode of operation, the output of the feedback loop does not adjust at least one operating parameter of the light source 242 responsive to the electrical signal 307. Here, the switch 325 is in an open position. For example, if at least one operating parameter is a bias current of the light source 242, then the light source 242 is provided with a first adjustable bias current that includes the output of the feedback loop during the first mode of operation, and the light source 242 is provided with a second non-adjustable bias current that includes the output of the feedback loop during the second mode of operation. Further, it may be said that the first mode of operation corresponds to an acquire mode of operation where the feedback loop is acquiring information (e.g., light source threshold information) about the light source 242 and adjusting the bias current of the light source 242, and the second mode of operation corresponds to a hold mode of operation where the feedback loop holds its output constant to drive the light source 242.

According to at least one example embodiment, the LPCC 270 includes an amplifier 310 positioned in the feedback loop between the sensor 265 and the light source 242. The amplifier 310 may be a transimpedance amplifier (TIA) (or any other suitable amplification device) that amplifies the electrical signal 307 to provide an amplified electrical signal 312. The LPCC 270 includes an error amplifier 315 that compares the amplified electrical signal 312 against a reference signal from power source 320 that represents a desired output of the light source 242. Here, an output 317 of the error amplifier 315 is used to automatically adjust a bias current provided to the light source 242 through the switch 325, capacitance 330 and converter 335 (e.g., a voltage to current converter). Here, the amplified electrical signal 312 comprises a voltage indicative of an output power of the light source 242, and the reference signal comprises a reference voltage Vref. The value of capacitance 330 is chosen such that the output 317 of the error amplifier 315 is held constant when the switch 325 is open. Thus, the value of the capacitance 330 is a design parameter set based on empirical evidence and/or user preference. The converter 335 may convert the signal at node 333 into a signal for driving the light source 242. For example, the converter 335 may convert a voltage at node 333 to a bias current for driving the light source 242.

It should be understood that amplifier 310 is an optional element and may be removed from the LPCC 270 if the electrical signal 307 has a desired amplitude such that further amplification is not needed. In this case, the electrical signal 307 is provided to error amplifier 315 without being amplified by amplifier 310.

FIG. 3 further illustrates open loop current sources 300 and 305 that generate currents I2 and I1_Target, respectively. These current sources 300/305, converter 335 and error amplifier 315 are powered by voltage Vcc. Current sources 300 and 305 are enabled/disabled by switches 340 and 345 depending on an operating mode of the system. For example, current source 300 is enabled while switch 325 is open and disabled while switch 325 is closed. Current source 305 is enabled while switch 325 is both closed and open. In other words, the current source 300 is enabled while the feedback loop is in the hold mode (or write mode) of operation and disabled while the feedback loop is in the acquire mode (or read mode) of operation. Current source 305 is enabled while the feedback loop is in the acquire mode (or read mode) of operation and remains enabled while the feedback loop is in the hold mode (or write mode) of operation. Thus, I2 is chosen such that $I_L$ is equal to a desired non-adjustable bias current Iw during the hold mode of operation (see FIG. 4).

According to at least one example embodiment, current source 300 is enabled at the transition of the read/write signal R/W from the read mode to the write mode such that a sum of I2, I1_Target and the output current $I_F$ from converter 335 is used to drive the light source 242. Meanwhile, current source 305 is enabled prior to a transition of the read/write signal R/W from a read mode to a write mode such that a sum of I1_Target and the output current $I_F$ from converter 335 drive the light source 242 in the acquire mode. To accomplish this timing, the position of the switch 340 may be based on the read/write signal R/W that also determines the position of switch 325, and the position of switch 345 may be based on a light source (or laser) enable signal L_En that also controls an activation sequence of the light source 242. In at least one example embodiment, the light source (or laser) enable signal L_En enables the light source 242 prior to the read/write signal R/W transitioning from read to write in order to provide time for the feedback loop to measure output of the light source 242 and adjust an output of the feedback loop such that the light source 242 has a desired power output (light source enable signal discussed in more detail below with reference to FIG. 4). The light source enable signal L_En may be received by LPCC 270 from laser pulse data processor 256 as laser pulse control signal 140 (or as part of laser pulse control signal 140) or as a completely separate signal (e.g., from control registers in the preamplifier 108).

Although not explicitly shown in FIG. 3, it should be understood that write driver 260 may be positioned between the outputs of 300/305/335 and light source 242 if desired. However, the write driver 260 can be bypassed or not included if the outputs of 300/305/335 are sufficient to drive the light source 242 without amplification by the write driver 260.

As shown in FIGS. 2 and 3, the light source 242 may comprise a laser that is used as part of an HAMR system. In this case, the first mode of operation aligns with a first period of time in which a read/write head 120 of the HAMR system is operating in a read mode, and the second mode of operation aligns with a second period of time in which the read/write head 120 of the HAMR system is operating in a write mode.

FIG. 4 illustrates an example timing diagram for operating the storage system described in FIGS. 1-3.

FIG. 4 illustrates the timing relationship between the light source enable signal L_En, the read/write signal R/W, and the light source bias current (or bias current) $I_L$. With reference to FIGS. 3 and 4, during a first period of time, the light source enable signal L_En transitions to a high state in order to begin the acquire mode of operation (or first mode of operation). Here, the current source 300 is disabled (because the read/write signal R/W is low), and the acquire mode of operation causes the switch 325 to close and the current source 305 to be enabled to provide an adjustable bias current $I_L$ to the light source 242 that settles at a desired light source activation threshold $I_T$, $I_T$+4 mA, or $I_T$−4 mA. In this mode of operation, the LPCC 270 adjusts (or corrects) the bias current $I_L$ to the desired light source activation threshold (e.g., $I_T$, $I_T$+4 mA, or $I_T$−4 mA) in area 400 (see FIG. 5 for a zoomed-in view of area 400). Here, the light source activation threshold is based on the bias current that the light source 242 should receive in order to cause emission of light. In at least one example embodiment, the light source activation threshold is chosen to be slightly less (e.g., a few mA less) than the bias current required to cause emission of light from the light source 242. Thus, the acquire mode of operation may be viewed as a warm-up period for the light source 242, where the bias current $I_L$ of the light source 242 is brought to within some desired amount of a value that causes emission of light. In FIG. 4, $I_T$ is an initial light source activation threshold of the light source 242, and $I_T+4$ mA and $I_T-4$ mA are example variations in the initial light source activation threshold caused by, for example, temperature variations of the light source 242 and/or around the light source 242. In at least one example embodiment, the light source activation threshold may be a design parameter set based on empirical evidence and/or user preference. Area 400 in FIG. 4 illustrates how example embodiments correct three different light source activation thresholds (i.e., $I_T$, $I_T+4$ mA, and $I_T-4$ mA). In at least one example embodiment, $I_T$ is equal to I1_Target when the light source 242 is in an initial state (e.g., at ambient temperature before a first write operation), and the output current $I_F$ of converter 335 causes $I_T$ to shift+/−4 mA to one of $I_T+4$ mA and $I_T-4$ mA to account for temperature variations of the light source 242 prior to subsequent write operations.

FIG. 4 further illustrates the hold mode of operation (or second mode of operation) during a second period of time, which may correspond to a write mode of the read/write signal R/W. In the hold mode of operation, the switch 325 is opened, the current source 300 is enabled, and the current source 305 remains enabled. The output current $I_F$ of converter 335 is now held constant using the voltage at node 333 so that the light source 242 is provided with a non-adjustable bias current $I_L$ at a value of Iw, (or Iw+4 mA or Iw−4 mA), which is equal to a sum of I2, I1_Target and the output current $I_F$. In the context of HAMR, the hold mode of operation corresponds to a period in which the light source 242 heats the recording medium to achieve a heat-assisted write operation.

Following the hold mode of operation in FIG. 4, bias current $I_L$ returns to the value of $I_T$ used during the acquire mode of operation for as long as the light source enable signal L_En is activated.

Although FIG. 4 illustrates three example values for bias current $I_L$ in the acquire mode of operation and the hold mode of operation, example embodiments are not limited thereto, and LPCC 270 may adjust bias current $I_L$ to any desired value in both modes of operation based on current sources 300/305 and output current $I_F$.

FIG. 5 illustrates a zoomed-in version of area 400 of FIG. 4 according to at least one example embodiment. As shown in FIG. 5, the light source activation thresholds $I_T$, $I_T+4$ mA, and $I_T-4$ mA are corrected within about 200 ns of enabling the light source 242. By comparison, correction of the light source activation threshold using firmware (instead of using LPCC 270) would take significantly longer, for example, hundreds of μs, which causes unnecessary power consumption and decreases or limits performance. Because example embodiments are able to quickly correct the light source activation threshold before a write operation, power consumption of the light source 242 may be reduced and recording capacity may be increased by enabling more frequent threshold correction.

Figure 6:
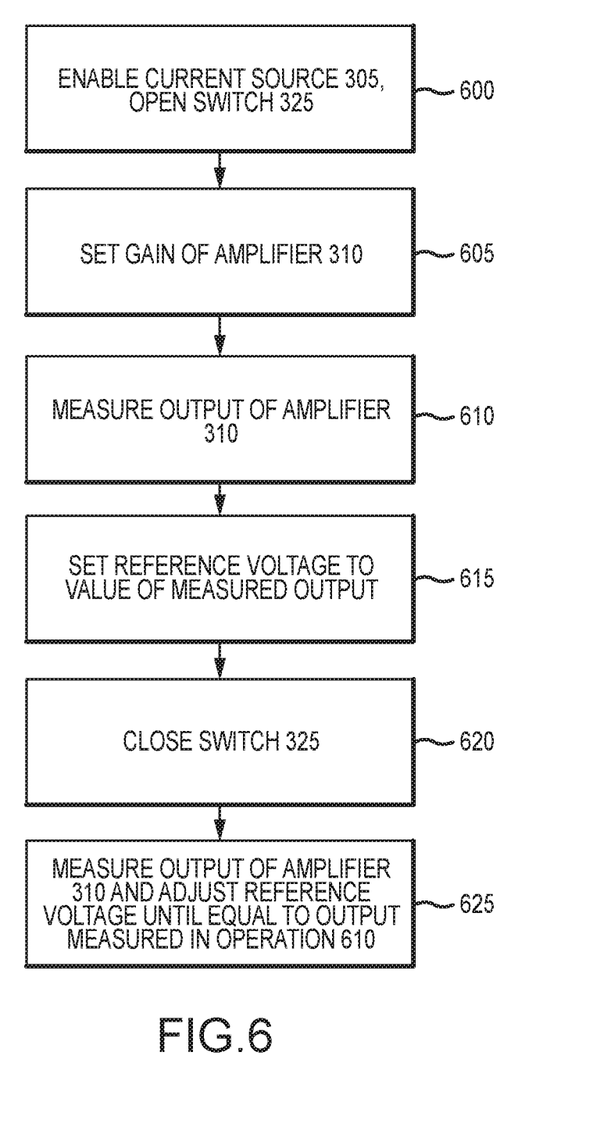
FIG. 6 illustrates example operations for initializing (or calibrating) the LPCC described with respect to FIGS. 1-5.

FIG. 6 illustrates example operations for initializing (or calibrating) the LPCC 270 described with respect to FIGS. 1-5. Thus, the operations of FIG. 6 may be carried out prior to being implemented in the field, for example, during manufacturing of the storage system 100. While a general order for the steps of the method is shown in FIG. 6, the method can include more or fewer steps or can arrange the order of the steps differently than those shown in FIG. 6. Generally, the method starts at operation 600 and ends at operation 625. The method can be executed as a set of computer-executable instructions executed by a computer system and encoded or stored on a computer readable medium. Alternatively, the operations discussed with respect to FIG. 6 may be implemented by the various elements of the magnetic storage system 100 described with respect to FIGS. 1-5 (e.g., the LPCC 270). Hereinafter, FIG. 6 shall be explained with reference to the systems, components, assemblies, devices, user interfaces, environments, software, etc. described in conjunction with FIGS. 1-5.

In operation 600, the method enables current source 305 and opens switch 325. This signifies an open loop mode of the LPCC 270.

In operation 605, still in the open loop mode, the method sets the value of current source 305 and a gain of the amplifier 310 to a level that represents a desired power of the light source 242 prior to a write operation (e.g., during the acquire mode of FIG. 4). The desired power of the light source 242/gain of the amplifier 310 may be design parameters set based on empirical evidence and/or user preference.

In operation 610, the method measures an output of the amplifier 310 and defines the measured output as $V_M$. According to one embodiment, the output of amplifier 310 is measured using analog to digital conversion.

In operation 615, the method sets the reference voltage Vref of voltage source 320 to the value of the measured output $V_M$. Here, for the sake of explanation, the method assumes unity gain from the value $V_M$ to the output current $I_F$. However, it should be understood that the reference voltage Vref may be scaled to account for the gain of the feedback loop such that Vref−$V_M$=0. Further, it should be understood that reference voltage Vref can be changed after the calibration procedure of FIG. 6 without re-calibrating the entire system.

In operation 620, switch 325 is closed such that the converter 335 outputs $I_F$ based on the voltage at node 333. This signifies a closed loop mode of the LPCC 270.

In operation 625, the method again measures the output of amplifier 310 and adjusts the reference voltage Vref until Vref=$V_M$. Now, bias current $I_L$ is equal to the sum of I1_Target and the output current $I_F$, which is the desired bias current (or desired power) prior to a write operation (e.g., one of $I_T$, $I_T+4$ mA, and $I_T-4$ mA). Further variations in the light source activation threshold are compensated for by the feedback loop during the acquire mode prior to subsequent write operations.

Figure 7:
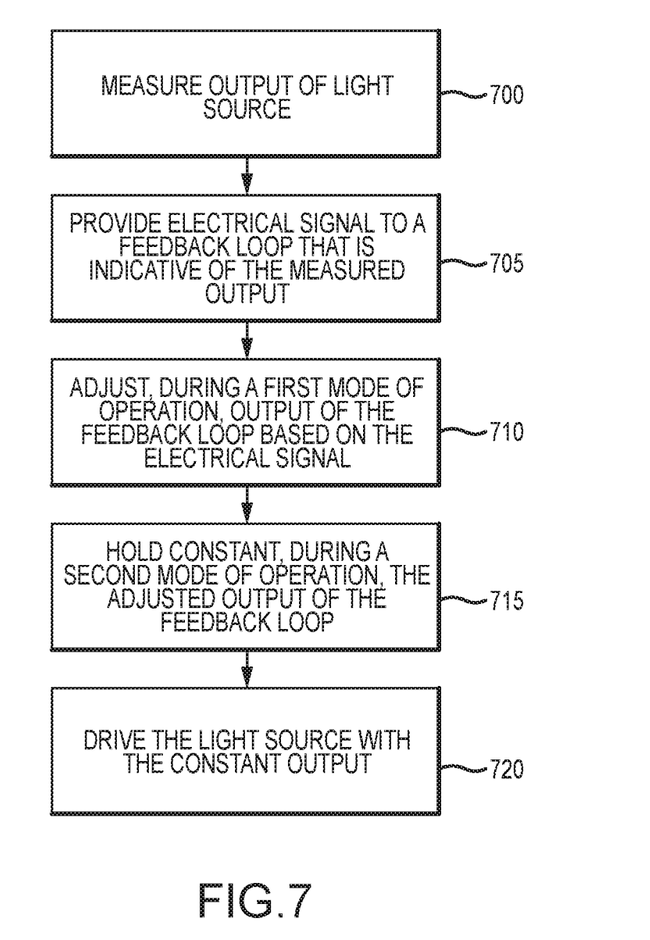
FIG. 7 illustrates example operations for operating the storage system 100 described with respect to FIGS. 1-6.

FIG. 7 illustrates example operations for operating the storage system 100 described with respect to FIGS. 1-6. While a general order for the steps of the method is shown in FIG. 7, the method can include more or fewer steps or can arrange the order of the steps differently than those shown in FIG. 6. Generally, the method starts at operation 700 and ends at operation 720. The method can be executed as a set of computer-executable instructions executed by a computer system and encoded or stored on a computer readable medium. Alternatively, the operations discussed with respect to FIG. 7 may be implemented by the various elements of the magnetic storage system 100 described with respect to FIGS. 1-6. Hereinafter, FIG. 7 shall be explained with reference to the systems, components, assemblies, devices, user interfaces, environments, software, etc. described in conjunction with FIGS. 1-6.

In operation 700, the method measures output of the light source 242. For example, the sensor 265 measures power of the light source 242.

In operation 705, the method (e.g., the sensor) provides an electrical signal to the feedback loop of FIG. 3 that is indicative of the measured output.

In operation 710, the method adjusts, during a first mode of operation, output of the feedback loop (e.g., output current $I_F$) based on the electrical signal. Here, the first mode of operation may correspond to the acquire mode of operation in FIG. 4, which can include a read mode of the storage system 100. In at least one example embodiment, the adjusting includes comparing the electrical signal to a reference signal (e.g., reference voltage Vref) so that the output current $I_F$ of the feedback loop is adjusted based on the comparing.

In operation 715, the method holds constant, during a second mode of operation, the adjusted output current $I_F$ of the feedback loop. Here, the second mode of operation may correspond to the hold mode of operation in FIG. 4, which may be a write mode of the storage system 100.

In operation 720, the method drives the light source 242 with the constant output such that the constant output is a portion of bias current $I_L$ (i.e., $I_L=I2+I_F+I1\_Target$).

In view of the foregoing description, it should be understood that example embodiments enable relatively high bandwidth (e.g., about 10 MHz-100 MHz) for power control of the light source 242, in part because the LPCC 270 is contained in the preamplifier 108. Example embodiments further provide fast read to write and write to read transition times (e.g., about 10 ns) due to the acquire and hold modes, which can improve performance of the storage system 100. That is, power of the light source 242 is sampled during the acquire mode to learn light source threshold information, and then the hold mode is used during a write operation to avoid disturbing the bias current of the light source 242. Further, example embodiments quickly correct the light source activation threshold before a write operation, which may reduce power consumption of the light source 242 and increase recording density by enabling more frequent correction of laser power.

Specific details were given in the description to provide a thorough understanding of the embodiments. However, it will be understood by one of ordinary skill in the art that the embodiments may be practiced without these specific details. In other instances, well-known circuits, processes, algorithms, structures, and techniques may be shown without unnecessary detail in order to avoid obscuring the embodiments.

While illustrative embodiments of the disclosure have been described in detail herein, it is to be understood that the inventive concepts may be otherwise variously embodied and employed, and that the appended claims are intended to be construed to include such variations, except as limited by the prior art.

What is claimed is:

1. A circuit, comprising:
a light source;
a sensor that measures output of the light source and provides an electrical signal to a feedback loop that is indicative of the measured output of the light source, wherein the feedback loop is connected to an input of the light source such that the output of the light source is adjustable in response to output of the feedback loop that is based on the electrical signal; and
a switch positioned in the feedback loop that is movable between a first position and a second position depending upon whether the feedback loop is operating in a first mode of operation or a second mode of operation, wherein during the first mode of operation the output of the feedback loop adjusts at least one operating parameter of the light source responsive to the electrical signal, and wherein during the second mode of operation the output of the feedback loop does not adjust the at least one operating parameter of the light source responsive to the electrical signal.

2. The circuit of claim 1, further comprising:
an error amplifier that compares the electrical signal against a reference signal that represents a desired output of the light source, wherein an output of the error amplifier is used to automatically adjust a bias current provided to the light source.

3. The circuit of claim 2, wherein the electrical signal comprises a voltage indicative of an output power of the light source and wherein the reference signal comprises a reference voltage.

4. The circuit of claim 1, wherein the first mode of operation corresponds to an acquire mode of operation and wherein the second mode of operation corresponds to a hold mode of operation.

5. The circuit of claim 4, wherein the light source comprises a laser that is used as part of a Heat Assisted Magnetic Recording (HAMR) system.

6. The circuit of claim 5, wherein the first mode of operation aligns with a first period of time in which a read/write head of the HAMR system is operating in a read mode and wherein the second mode of operation aligns with a second period of time in which the read/write head of the HAMR system is operating in a write mode.

7. The circuit of claim 1, wherein the light source is provided with a first adjustable bias current that includes the output of the feedback loop during the first mode of operation and wherein the light source is provided with a second non-adjustable bias current that includes the output of the feedback loop during the second mode of operation.

8. The circuit of claim 1, wherein the switch comprises a transistor.

9. The circuit of claim 1, wherein the sensor comprises at least one of a photodiode, a photo detector, and a bolometer.

10. The circuit of claim 9, further comprising an amplifier positioned in the feedback loop between the sensor and the light source.

11. A method, comprising:
measuring output of a light source;
providing an electrical signal to a feedback loop that is indicative of the measured output of the light source;
adjusting, during a first mode of operation, output of the feedback loop based on the electrical signal; and
holding constant, during a second mode of operation, the adjusted output of the feedback loop; and
driving, during the second mode of operation, the light source with the constant output of the feedback loop.

12. The method of claim 11, wherein the first mode of operation corresponds to a read mode of a magnetic recording system and wherein the second mode operation corresponds to a write mode of the magnetic recording system.

13. The method of claim 11, further comprising:
comparing the electrical signal to a reference signal that represents a desired output of the light source, wherein the adjusting adjusts the output of the feedback loop based on the comparing.

14. The method of claim 13, wherein the electrical signal comprises a voltage indicative of an output power of the light source and wherein the reference signal comprises a reference voltage.

15. The method of claim 11, wherein the constant output is a portion of a bias current of the light source.

16. A circuit, comprising:

a light source;

a sensor that generates an electrical signal indicative of an output of the light source and that provides the electrical signal to a feedback loop; and a switch positioned in the feedback loop that is movable between a closed position and an open position depending upon whether the feedback loop is operating in a first mode of operation or a second mode of operation, wherein during the first mode of operation the switch is in the closed position such that output of the feedback loop adjusts at least one operating parameter of the light source responsive to the electrical signal, and wherein during the second mode of operation switch is in the open position such that the output of the feedback loop does not adjust the at least one operating parameter of the light source responsive to the electrical signal.

17. The circuit of claim 16, wherein the light source is a laser used as part of a Heat Assisted Magnetic Recording (HAMR) system.

18. The circuit of claim 17, wherein the first mode of operation corresponds to a read mode of the HAMR system and wherein the second mode of operation corresponds to a write mode of the HAMR system.

19. The circuit of claim 16, further comprising:

an amplifier that amplifies the electrical signal.

20. The circuit of claim 18, further comprising:

first and second current sources that drive the light source, wherein the first current source is enabled during the write mode and disabled during the read mode, and wherein the second current source is enabled during both the read mode and the write mode;

an error amplifier that compares the amplified electrical signal against a reference signal to generate an output signal, wherein the reference signal represents a desired output of the light source; and a converter that converts the output signal to a drive signal that drives the light source in conjunction with the first and second current sources to have the desired output during the second mode.

\* \* \* \* \*